United States Patent [19]

Igashira et al.

[11] Patent Number: 4,728,074
[45] Date of Patent: Mar. 1, 1988

[54] PIEZOELECTRIC FLOW CONTROL VALVE

[75] Inventors: Toshihiko Igashira, Toyokawa; Yasuyuki Sakakibara, Nishio; Kazuhide Watanabe, Toyohashi; Nobuyuki Murate, Okazaki, all of Japan

[73] Assignee: Nippon Soken, Inc., Nishio, Japan

[21] Appl. No.: 925,251

[22] Filed: Oct. 31, 1986

[30] Foreign Application Priority Data

Nov. 2, 1985 [JP] Japan .................. 60-245313

[51] Int. Cl.$^4$ .......................................... F02M 51/06
[52] U.S. Cl. ....................................... 251/57; 123/458;
 123/447; 123/498; 239/584
[58] Field of Search .................... 251/129.06; 123/457,
 123/447, 458, 498, 460; 239/584

[56] References Cited

U.S. PATENT DOCUMENTS

| 4,022,166 | 5/1977 | Bart .................. 251/129.06 X |
| 4,535,743 | 8/1985 | Igashira .................. 123/472 |
| 4,584,980 | 4/1986 | Weiger .................. 123/458 |

FOREIGN PATENT DOCUMENTS 59-206668  11/1984  Japan .

OTHER PUBLICATIONS

English translation of abstract of Japanese Patent Publication No. 59-206668, 11/22/84.

*Primary Examiner*—Alan Cohan
*Attorney, Agent, or Firm*—Cushman, Darby & Cushman

[57] ABSTRACT

A piezoelectric flow control valve comprising a slidable closure member (22) for controlling a flow of fluid through a fluid passage (42) between a fluid inlet (40) and a fluid outlet (32). The closure member (22) is biased toward a normally closed position by a plunger (70) responsive to a hydraulic pressure in a pressure chamber (78) which is in fluid communication with the fluid inlet (40) through a restriction and with a pumping chamber (96) of a piezoelectric pump (72). In order to prevent fluid leakage under situations wherein the fluid pressure at the fluid inlet (40) is not high enough to ensure closure of the member (22), the present invention provides spring biased pressure mechanism (106) for biasing the closure member (22) toward the normally closed position and override means (130) for overriding the pressure mechanism (106) in response to a predetermined pressure at the fluid inlet (40).

6 Claims, 2 Drawing Figures

PIEZOELECTRIC FLOW CONTROL VALVE

BACKGROUND OF THE INVENTION

1. Field of the Invention

This invention relates to a piezoelectric flow control valve and a fuel injector incorporating the same.

2. Description of the Related Art

Japanese unexamined patent publication No. 59-206668 published Nov. 22, 1986 and U.S. Pat. No. 4,535,743 issued to Igashira et al. on Aug. 20, 1986, both assigned to the assignee of the present invention, disclose piezoelectric flow control valves as applied to fuel injectors. The flow control valve comprises a body having a fluid inlet and a fluid outlet connected by an internal fluid passage. A movable valve member in the form of a needle valve is accommodated within the body to open and close the internal passage and thus control the outflow of fluid under pressure through the outlet. A plunger integral with the needle valve is slidably received in an axial bore in the body to define a pressure chamber. The hydraulic pressure prevailing at the fluid inlet is transmitted, through a small annular clearance between the axial bore in the body and the outer periphery of the plunger or through a fluid passage in the plunger, to the pressure chamber thereby causing the plunger to bias the needle valve in the closing direction. The pressure chamber is also communicated with a pumping chamber of a piezoelectric pump having a piezoelectric actuator controlled by a control unit. When the piezoelectric actuator is signalled in such a manner as to cause contraction of the piezoelectric stack thereof, the volume of the pumping chamber is increased. This causes a reduction in the hydraulic pressure in the pressure chamber, whereby the needle valve is lifted to allow release of the fluid under pressure through the fluid outlet. Conversely, when the piezoelectric actuator is controlled to cause the piezoelectric stack to expand, a high pressure is developed in the pressure chamber causing the needle valve to move into the closed position. In this manner, the flow control valve is opened and closed by varying the hydraulic pressure acting on the plunger in response to control signals to the piezoelectric actuator.

The piezoelectric flow control valve of this nature is particularly suitable to the control of a fluid flow with a high accuracy, because the piezoelectric actuator operates with a very high responsiveness, compared with a solenoid operated actuator.

However, the problem encountered in the above described flow control valve is that, since the needle valve is arranged to be closed only upon application of the fluid pressure in the pressure chamber onto the plunger, the fluid tends to leak or seep through the fluid outlet of the control valve when the feed pressure at the fluid inlet is zero or is not high enough to tightly close the needle valve.

SUMMARY OF THE INVENTION

Therefore, the primary object of the present invention is to improve the piezoelectric flow control valve of the class described above in such a manner that the needle valve is held tightly closed to prevent fluid leakage even when the feed pressure at the fluid inlet is zero or is not at a high level.

In one aspect thereof, this invention provides a piezoelectric flow control valve of the class described and further comprising a spring biased pressure mechanism for biasing the needle valve in the closing direction thereof and an override mechanism responsive to the fluid pressure at the fluid inlet for overriding the pressure mechanism.

With this arrangement, when the feed pressure at the fluid inlet is zero or not high enough to apply an adequate biasing force to the plunger, the needle valve is tightly closed under the action of the spring biased pressure mechanism, thereby preventing any inadvertent leakage of fluid. When the feed pressure at the fluid inlet is increased to a level sufficient to cause the plunger to force the needle valve into the tightly closed position, the override mechanism overrides the biasing force of the pressure mechanism. Thereafter, the movement of the needle valve is controlled by the piezoelectric pump to open and close the flow control valve.

In a preferred embodiment of the invention, the spring biased pressure mechanism may be comprised of a spring and a pressing member urged by the spring into contact with the needle valve. The override mechanism may comprise a second pressure chamber adapted to reflect the fluid pressure at the fluid inlet and a piston responsive to the fluid pressure within the second pressure chamber to move into engagement with the pressing member and lift the pressing member away from the needle valve against the action of the spring.

In another embodiment of the invention, the piston is adapted to move between a first position wherein the pressing member is brought into contact with the needle valve and a second position wherein the piston is brought into engagement with the pressing member to move the pressing member away from contact with the needle valve. In the first position of the piston, the second pressure chamber is in fluid communication with the internal fluid passage through a restriction, while in the second position of the piston, the second pressure chamber is substantially freely communicated with the internal fluid passage. In this manner, once the piston has moved into the second position in response to a pressure rise in the second pressure chamber, the fluid in the internal passage is able to freely flow into or out of the second pressure chamber, thereby allowing the spring biased piston to move in response to the pressure variation in the internal fluid passage so that the volume of the second pressure chamber is varied in response to that pressure variation. Thus, the second pressure chamber serves as an accumulator for the fluid in the internal fluid passage to subdue the pressure surge in the internal fluid passage.

In another aspect, this invention provides a piezoelectric fuel injector including a needle valve adapted to open and close an internal fuel passage connecting a high pressure fuel inlet and an outlet orifice, a plunger for biasing the needle valve in the closing direction in response to a fuel pressure in a pressure chamber subjected to the fuel pressure at the fuel inlet, and a piezoelectric pump having a pumping chamber communicated with the pressure chamber and adapted to vary the volume of the pumping chamber in response to control signals. The feature of the fuel injector is that it further comprises a spring biased pressure mechanism for urging the needle valve in the closing direction and an override mechanism for overriding the pressure mechanism in response to the fuel pressure at the fuel inlet.

These and other objects of the invention, as well as other features thereof, will become apparent from the following description.

DESCRIPTION OF THE PREFERRED EMBODIMENTS

Figure 1:
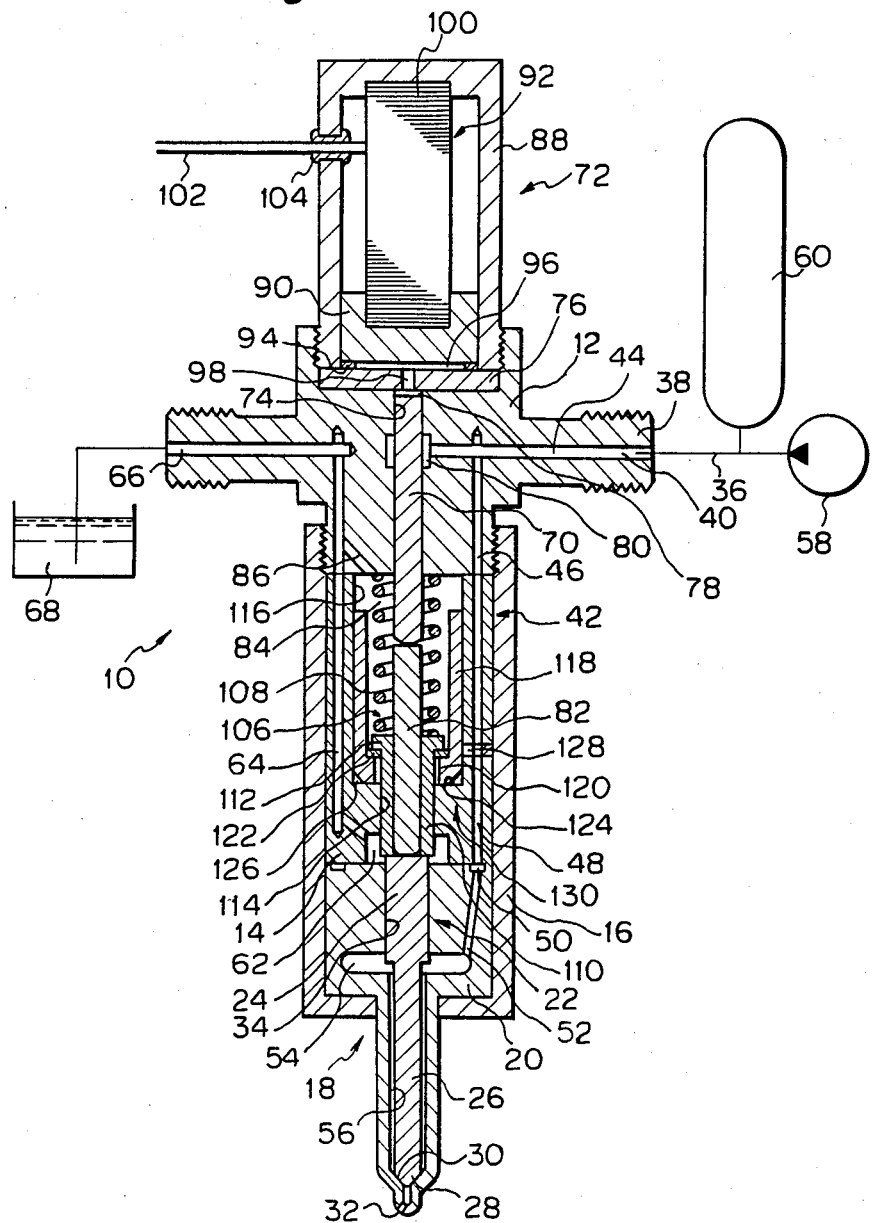
FIG. 1 is a view, partly in cross section and partly in diagrammatic representation, of the piezoelectric flow control valve as applied to a piezoelectric fuel injector, with the injector being shown as connected to a high pressure fuel source and a fuel reservoir, and the piston shown in the first position thereof.

Referring now to the drawings, FIG. 1 illustrates the piezoelectric flow control valve as applied to a fuel injector of a diesel engine. A plurality of fuel injectors may be installed on the cylinder head of the engine to supply fuel into associated combustion chambers, as is well known in the art.

The fuel injector 10 includes an injector body 12, an inner casing 14, and a nozzle assembly 18, which are held together by a threaded retainer 16 screwed around the body 12. The nozzle assembly 18 is of the conventional design and includes a nozzle body 20 and a movable needle valve member 22 slidably received therein. The needle valve member 22 has a larger diameter portion 24 and a smaller diameter portion 26, with a conical tip portion 28 adapted to cooperate with a valve seat 30 of the nozzle body 20 to open and close an outlet orifice 32. The larger diameter portion 24 of the needle 22 is slidably fitted within an axial bore 34 in the nozzle body 20, with a clearance of about 2 μm therebetween.

The injector body 12 has an inlet fitting 38 with a fuel inlet 40 adapted to be connected to a high pressure fuel line 36. The fuel inlet 40 is communicated with the outlet orifice 32 through an internal fuel passage 42 which, in the illustrated embodiment, is comprised of a radial passage 44 in the body 12, an axial passage 46 in the body 12, an axial passage 48 in the inner casing 14, an annular groove 50 on the upper surface of the nozzle body 20, an inclined passage 52 in the nozzle body 20, an annular fuel chamber 54, and a narrow annular passage 56 defined around the small diameter portion 26 of the needle valve member 2. During operation of the engine, a conventional hydraulic pump such as a vane pump 58 supplies a high pressure fuel to the fuel inlet 40, the pressure of the fuel being regulated, for example, to 200 kg/cm² by a conventional accumulator 60 connected to the high pressure line 36.

A small amount of fuel leaked through a clearance between the axial bore 34 and the large diameter portion 24 of the needle valve member 22 into a cavity 62 is returned to a fuel reservoir 68 through a drain passage 64 in the inner casing 14 and through a drain port 66 in the injector body 12.

During engine operation, the fuel pressure prevailing in the fuel chamber 54 exerts an upwardly directed hydraulic force on the needle valve 22, thereby tending to lift the valve member 22 away from the associated valve seat. The movement of the needle valve 22 is controlled, however, by a plunger 70 which, in turn, is controlled by a piezoelectric pump 72. The plunger 70 is slidably fitted within an axial bore 74 in the injector body 12, with a diametrical clearance of about 20 μm provided between the axial bore 74 and the outer periphery of the plunger 70. The piezoelectric pump 72 includes a disk-shaped end plate 76, which together with the axial bore 74 and the plunger 70, defines a first pressure chamber 78. The first pressure chamber 78 is in fluid communication with an annular groove 80 around the plunger 70 through the above-mentioned clearance between the bore 74 and the outer periphery of the plunger 70. The annular groove 80 is communicated through the passage 44 with the fuel inlet 40 of the injector. Thus, the fuel pressure at the fuel inlet 40 will be reflected in the first pressure chamber 78 to exert a downwardly directed hydraulic force on the plunger 70. This force is transmitted, through a push rod 82 aligned with the plunger 70, to the needle valve 22, thereby biasing it in the closing direction. In order for the downwardly directed force to overcome the upwardly directed hydraulic force developed by the fuel pressure in the fuel chamber 54, to tightly close the needle valve member 22, the pressure receptive area of the plunger must be greater than the pressure receptive area of the needle valve member 22. Thus, in the illustrated embodiment, the diameter of the plunger 70 is selected to be about 4 mm. The plunger 70 may be formed integrally with the needle valve member 22 without the intervention of the push rod 82, as proposed in Japanese unexamined patent publication No. 59-206668 referred to hereinbefore. However, preferably the plunger 70 and the needle valve member 22 are formed as separate members, as this arrangement enables the injector body 12, the inner casing 14, and the nozzle body 20 to be readily centered-up. The lower ends of the plunger 70 and the push rod 82 are semispherical. The fuel leaked through the clearance between the plunger 70 and the axial bore 74 into an inner cavity 84 is discharged through a passage 86 in the body 12 toward the drain port 66.

The piezoelectric pump 72 includes a cup-shaped casing 88, a piston 90 closely and slidably fitted within the casing 88, a piezoelectric actuator 92, and the disklike end plate 76. The casing 88 is in a threaded engagement with the injector body 12, with the end plate 76 sandwiched therebetween. A resilient member such as an elastomeric O-ring 94 is disposed between the piston 90 and the end plate 76 to define a pumping chamber 96 and to bias the piston 90 into pressure contact with the piezoelectric actuator 92. The pumping chamber 96 is in fluid communication with the first pressure chamber 78 via a port 98 in the end plate 76. The diameter of the port 98 is made smaller than the diameter of the plunger 70, so that the end plate 76 serves as an abutment for the plunger 70 for limiting the upward travel thereof. The end plate 76 and the plunger 70 have specular polished lower and upper surfaces, respectively, so as to shut off the fuel under pressure from the fuel inlet 40 from flowing into the pumping chamber 96 once the plunger 70 has moved into contact with the end plate 76.

The piezoelectric actuator 92 has a conventional design and may comprise a stack 100 of piezoelectric disks. The piezoelectric stack 100 may include a plurality of piezoelectric ceramic disks made from a piezoelectric material such as lead zirconate titanate and numbering, for example, 50 in total, with each disk having a diameter of 15 mm and a wall thickness of 0.5 mm. These disks are stacked one on the other, with interleaved or printed thin electrodes disposed between consecutive disks. The electrodes are alternately connected to plus and minus lead wires 102 in such a manner that the piezoelectric disks are electrically connected in parallel with each other. The lead wires 102 extend through a grommet 104 fitted in the casing 88 and may be connected to a control unit, not shown. The control unit may control the piezoelectric actuator 92 in a manner similar to that disclosed in U.S. Pat. No. 4,535,743, the disclosure of which is incorporated by reference herein. When a voltage of about 500 V is applied through the lead wires 102 to the piezoelectric actuator 92, the piezoelectric stack 100 will axially expand by about 50 µm. Upon releasing the voltage or by applying an inverted voltage, the stack 100 will contract to resume the initial length thereof. Expansion and contraction of the piezoelectric stack 100 will cause displacement of the piston 90, thereby reducing and increasing the volume of the pumping chamber 96. It should be noted that, since the annular groove 80 and the first pressure chamber 78 are communicated with each other through a small clearance between the axial bore 74 and the outer periphery of the plunger 70, and because this clearance serves as a restriction for the fluid flow between the groove 80 and the first pressure chamber 78, the differential pressure once generated between the groove 80 and the first pressure chamber 78 by the displacement of the piston 90 will be equilibrilized only after a lapse of a certain time delay.

Thus, upon signalling the piezoelectric actuator 92 to cause expansion of the volume of the pumping chamber 96, the fuel pressure in the pumping chamber 96 and, hence in the first pressure chamber 78, is temporarily reduced to a level lower than the feed pressure at the groove 80, thereby allowing the plunger 70 to move upward into contact with the end plate 76 under the action of the hydraulic force applied to the needle valve 22 due to the fuel pressure in the fuel chamber 54. This causes the needle valve 22 to move away from the valve seat, thereby allowing fuel injection through the orifice 32. In this position, the volume of the first pressure chamber 78 becomes zero and the upper end surface of the plunger 70 is brought into a close contact with the lower surface of the end plate 76, so that the plunger 70 acts as a shutoff valve for interrupting the fluid communication between the annular groove 80 and the first pressure chamber 78, thereby preventing a flow of high pressure fuel into the pumping chamber 96. In this manner, the reduced fuel pressure in the pumping chamber 96 will act on the plunger 70 for the cross-sectional area of the port 98 so that the downwardly directed hydraulic force exterting on the plunger 70 is overcome by the upwardly directed hydraulic force exerted upon the needle valve 22 by the fuel pressure in the fuel chamber 54, whereby the plunger 70 is kept in contact with the end plate 76.

Conversely, when the piezoelectric actuator 92 is controlled to cause a reduction in the volume of the pumping chamber 96, the plunger 70 is forced to move away from the end plate 76 to bring the needle valve member 22 into the closed position under the action of the fuel pressure in the first pressure chamber 78.

In this manner, the needle valve member 22 is opened and closed by controlling the voltage signals applied to the piezoelectric actuator 92 of the pump 72.

During engine stoppage or when the engine is being cranked for restarting, the delivery pressure of the feed pump 58 will be zero or will not be high enough to impart to the plunger 70 the downward hydraulic force required to tightly close the needle valve 22. The present invention is directed to ensure that the needle valve 22 is tightly closed under these situations, to prevent the fuel from being inadvertently released.

According to the invention, the fuel injector 10 is provided with a spring biased pressure means 106 including a pressure spring 108 and a pressing member 110 in the form of a flanged sleeve. The spring 108 is disposed in a compressed state, between the flange 112 of the pressing sleeve 110 and the lower end of the injector body 12 to bias the sleeve 110 downwards into contact with the needle valve 22. The sleeve 110 slidably receives the push rod 82 therethrough and is slidably fitted within an axial bore 114 in the inner casing 14 with a clearance of about 2 µm therebetween.

The inner casing 14 has an open-ended cylinder bore 116 in which a piston 118 is closely and slidably fitted. The bore 116 and the piston 118 may be so sized that a clearance of about 10 µm is held therebetween. This clearance serves as a restriction, as described later. The piston 118 has a head with an aperture 120 for passing the sleeve 110 therethrough, the clearance between the aperture 120 and the outer periphery of the sleeve 110 being as large as about 1 mm. An annular packing 122 of copper is interposed between the sleeve flange 112 and the piston head to seal the clearance therebetween. Although the sleeve 110 and the piston 118 may be formed as an integral, i.e., one piece, member, preferably they are formed as separate members to facilitate centering-up of the cylinder bore 116 with respect to the axial bore 114.

The piston 118 is subjected via the sleeve 110 to a spring force from the pressure spring 108, which biases the piston 118 into contact with the bottom wall of the open-ended bore 116 in the inner casing 14 as shown in FIG. 1. In this first position of the piston 118, the spring 108 urges the sleeve 110 into contact with the needle valve 22 thereby bringing it to the closed position. The peripheral edge of the piston head is chamfered at 124 so that an annular second pressure chamber 126 is defined between the piston 118 and the inner casing 14 in the first position of the piston 118. In this first position, the second pressure chamber 126 is connected to the internal fuel passage 42, more specifically, to the passage 48, through the above-mentioned clearance formed between the outer periphery of the piston 118 and the cylinder bore 116 and having the restriction effect, and through a radial port 128 in the inner casing 14. The port 128 is so positioned that it is directly opened into the second pressure chamber 126 when the piston 118 travels from the first position by about 3 mm to move into the second position. Further upward movement of the piston 118 is permitted until it abuts against the lower end surface of the injector body 12. The maximum travel of the piston 118 may be, for example, 5 mm. The piston 118 and the second pressure chamber 126 together make up an override means 130 for overriding the biasing force of the pressure means 106.

Figure 2:
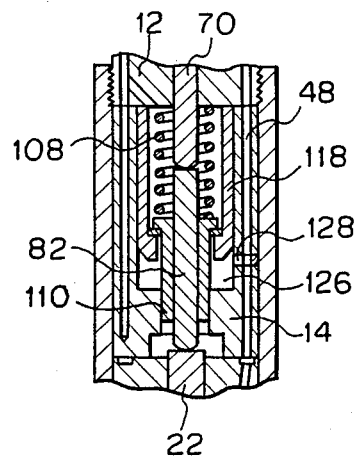
FIG. 2 is a view showing a part of the fuel injector shown in FIG. 1, and showing the piston in the topmost position thereof.

Operation of the fuel injector will be described below with reference to FIGS. 1 and 2.

When the engine is completely stopped, the fuel injector 10 is in the position shown in FIG. 1. The accumulator 60, the fuel line 36, the fuel inlet 40, the internal fuel passage 42 including the fuel chamber 54, the first pressure chamber 78, the pumping chamber 96, and the second pressure chamber 126 are all filled with a fuel under atmospheric pressure.

To start the engine, the electrically driven feed pump 58 is operated first. Generally, it takes only about one second to re-establish a pressure of 200 kg/cm$^2$ within the accumulator 60. The pressure in the accumulator 60 is instantaneously transmitted through the fuel passage 42 to the fuel chamber 54, resulting in a rapid pressure rise therein. However, since the clearance between the axial bore 74 and the outer periphery of the plunger 70 and the clearance between the cylinder bore 116 and the outer periphery of the piston 118 serve as restrictions, the pressure rise in the first and second pressure chambers 78 and 126 is achieved only gradually, and is delayed for about one second with respect to the pressure rise in the fuel chamber 54. Thus, the fuel pressure in the fuel chamber 54 will exert an upward force on the needle valve 22, tending to lift it away from the associated valve seat 30. If this lift of the needle valve 22 is allowed, the fuel would flow out of the orifice 32 and it would not be possible to increase the pressure in the accumulator 60, even to about 50 kg/cm$^2$. However, according to the present invention, in the position shown in FIG. 1, the pressure spring 108 acts on the needle valve 22 through the sleeve 110 to urge the needle valve 22 into pressure contact with the valve seat 30, so that the needle valve 22 lift will not take place unless the pressure in the fuel chamber 54 exceeds 200 kg/cm$^2$.

The increased pressure at the fuel inlet 40 will then is transmitted, through the port 128 and through the clearance of about 10 μm between the cylinder bore 116 and the outer periphery of the piston 118, to the second pressure chamber 126, to cause the pressure therein to reach 200 kg/cm$^2$ within a delay of about one second after the pressure rise in the fuel chamber 54. Simultaneously therewith, the pressure at the fuel inlet 40 is transmitted to the second pressure chamber 126 through the annular groove 80 and through the clearance of about 20 μm between the axial bore 74 and the outer periphery of the plunger 70, so that the fuel pressure in the second pressure chamber 126 reaches 200 kg/cm$^2$ at the same time as the pressure rise in the first pressure chamber 78. These two clearances are calibrated such that the pressures in both the first and second pressure chambers 78 and 126 simultaneously reach 200 kg/cm$^2$.

When the fuel pressure in the second pressure chamber 126 approaches 200 kg/cm$^2$, the piston starts to move upwards against the action of the pressure spring 108. As soon as the head of the piston 118 is moved out of contact with the bottom wall of the bore 116 in the inner casing 14, the pressure receptive area of the piston 118, which is subjected to the fuel pressure in the second pressure chamber 126, is enlarged whereby the upward movement of the piston is accelerated until it abuts against the lower end surface of the injector body 12. This topmost position of the piston 118 is shown in FIG. 2. In this position, the piston 118 lifts the sleeve 110 away from the needle valve 22, so that the biasing force of the pressure spring 108 no longer acts on the needle valve 22. Thus, the needle valve is now subjected to the downwardly directed hydraulic force developed by the fuel pressure in the first pressure chamber 78 and which is transmitted thereto through the plunger 70 and the push rod 82. Since the pressure receptive area of the plunger 70 is slightly greater than that of the needle valve 22, as mentioned before, the downward force acting on the needle valve 22 due to the hydraulic pressure in the first pressure chamber 78 overcomes the upward force due to the hydraulic pressure in the fuel chamber 54 so that the needle valve 22 is held in pressure contact with the associated valve seat 30. A voltage of 500 V is then applied to the piezoelectric actuator 92 to cause expansion of the piezoelectric stack 100, thereby causing the pumping piston 90 to pressurize the fuel in the pumping chamber 96. However, the pressurized fuel in the pumping chamber 96 leaks through the clearance between the plunger 70 and the axial bore 74, so that the pressure in the pumping chamber 96 and the first pressure chamber 78 will then be equilibrilized to the feed pressure of 200 kg/cm$^2$. Thus, the engine is now ready to be restarted by cranking.

The engine is then cranked and the voltage to the piezoelectric actuator is released or an inverted voltage is applied thereto, at a proper timing and for a predetermined duration. This causes cyclic movement of the needle valve 22 and causes the fuel under the pressure of 200 kg/cm$^2$ to be cyclically injected through the orifice 32 into the associated combustion chamber, whereby the engine operation is started.

The spring force of the pressure spring 108 may be set such that the piston 118 is returned to the first position thereof when the fuel pressure in the second pressure chamber 126 becomes less than 100 kg/cm$^2$. Thus, the pressure spring 108 will act on the sleeve 110 to urge the needle valve 22 into tight contact with the associated valve seat 30 whenever the fuel pressure in the first pressure chamber 78 is not high enough to hydraulically close the needle valve 22 during engine stoppage or during the initial period in which the feed pump 58 starts operation.

In summary, the primary feature of the present invention is that the spring force of the spring biased pressure means biasing the valve member in its closing direction is overridden by the override means responsive to the fluid pressure. Therefore, when the present invention is applied to a fuel injector of an internal combustion engine, the needle valve 22 of the injector is positively held in the closed position by the spring force of the pressure means even under those situations wherein a sufficient fuel pressure is not established in the first pressure chamber 78 and the pumping chamber 96, and wherein there is a likelihood of the needle valve 22 being open due to residual pressure in the fuel chamber 54 or due to pressure in the combustion chamber.

Another important advantage of the invention is that upon travel of the piston 118 through a predetermined distance, the port 128 is brought into direct communication with the second pressure chamber 126 so that the piston 118 is displaced in response to the pressure variation in the internal fuel passage 42 and under the spring bias by the pressure spring 108. This enables the second pressure chamber 126 to function as an accumulator. During the operation of a flow control valve or a fuel injector, cyclic release of a fluid through the fluid outlet or outlet orifice 32 would result in a pressure fluctuation in the internal fluid passage 42. According to the invention, however, such a pressure fluctuation is effectively subdued because the accumulator 126 is situated close to the fluid outlet 32. This enables the flow control valve to control the fluid flow with an improved accuracy and enables the fuel injector to operate at an increased metering capability.

Although the present invention has been described herein with reference to the specific embodiments thereof, it is understood that the present invention is not limited thereby but changes and modifications may be made therein within the spirit of the present invention.

Specifically, the invention has been described with relation to a fuel injector for an internal combustion engine. However, the present invention is equally applicable to all flow control valves having piezoelectric actuators and it is intended to cover such flow control valves within the scope of the appended claims.

We claim:

1. In a piezoelectric flow control valve of the class having a fluid inlet for receiving a fluid under pressure, a fluid outlet, a fluid passage communicating said inlet with said outlet, a movable valve member for controlling the flow of fluid through said passage, a plunger responsive to the fluid pressure in a first pressure chamber for biasing the valve member in a closing direction thereof, said first pressure chamber being in fluid communication with said fluid inlet to reflect the fluid pressure at said inlet therein, and a piezoelectric pump having a pumping chamber in fluid communication with said first pressure chamber, said piezoelectric pump being operable to vary the volume of said pumping chamber in response to control signals applied thereto, whereby the valve member is opened and closed in response to pressure variation in said first pressure chamber, the improvement comprising:

spring biased pressure means for biasing said valve member in the closing direction thereof; and override means responsive to the fluid pressure at said fluid inlet for overriding said pressure means.

2. A piezoelectric control valve according to claim 1, wherein said pressure means comprises a spring and a pressing member resiliently biased by said spring into contact with said valve member, and wherein said override means comprises a second pressure chamber in fluid communication with said fluid inlet, and, a piston movable, in response to the fluid pressure in said second pressure chamber, into engagement with said pressing member to move said pressing member out of contact with said valve member against the action of said spring.

3. A piezoelectric flow control valve according to claim 2, wherein said piston is movable between a first position in which said pressing member is allowed to come into contact with said valve member and a second position in which said piston engages with said pressing member to move said pressing member away from said valve member, said second pressure chamber being in fluid communication with said fluid passage through a restriction in said first position of the piston, said second pressure chamber being in substantially unobstructed fluid communication with said fluid passage in said second position of the piston, whereby, in said second position of the piston, said piston cooperates with said second pressure chamber to form an accumulator for absorbing any pressure fluctuation in said fluid passage.

4. A piezoelectric flow control valve according to claim 4, wherein said flow control valve comprises a housing having an axial bore therein, said piston being slidably received in said axial bore, said housing further having a port communicating said fluid passage with said second pressure chamber in said second position of the piston, said restriction being formed by a clearance between said axial bore and an outer periphery of said piston so that in said first position of the piston, the fluid is permitted to flow from said fluid passage through said port and said clearance into said second pressure chamber.

5. A piezoelectric flow control valve according to claim 4, wherein said flow control valve comprises a push rod disposed between said plunger and said valve member, and wherein said pressor member comprises a flanged sleeve slidably fitted around said push rod and engageable with said valve member.

6. A piezoelectric flow control valve according to claim 5, wherein said flanged sleeve slidably and fluid tightly passes through a head of the piston and is adapted to be moved away from said valve member upon movement of the piston to cause engagement of the piston head with a flange of the sleeve.

* * * * *